United States Patent [19]

Lefkowitz et al.

[11] Patent Number: 4,524,384
[45] Date of Patent: Jun. 18, 1985

[54] VIDEO AND AUDIO SECURITY SYSTEM

[75] Inventors: Stephen Lefkowitz, Englewood Cliffs; Salvatore Benenati, Red Bank, both of N.J.; Edward S. Ickowski, Brooklyn, N.Y.

[73] Assignee: GBC Closed Circuit TV Corp., New York, N.Y.

[21] Appl. No.: 487,135

[22] Filed: Apr. 21, 1983

[51] Int. Cl.³ .............................................. H04N 7/18
[52] U.S. Cl. ..................................... 358/108; 358/229
[58] Field of Search ................................. 358/108, 229

[56] References Cited

U.S. PATENT DOCUMENTS

| | | | |
|---|---|---|---|
| 3,482,037 | 12/1969 | Brown | 358/108 |
| 3,564,132 | 2/1971 | Baker | 358/108 |
| 3,742,133 | 6/1973 | O'Sullivan | 358/108 |
| 4,232,196 | 11/1980 | Filippi | 358/108 |
| 4,355,329 | 10/1982 | Yoshida | 358/108 |

Primary Examiner—Howard W. Britton
Attorney, Agent, or Firm—Kenyon & Kenyon

[57] ABSTRACT

A video and audio system for monitoring an area, particularly an area adjacent a door, is disclosed. The system includes a video and audio assembly adapted to be mounted to a door and a video and audio console spaced from the door. Opening of the door is controlled by an electric door strike operated from the console. The assembly is quite compact which facilitates mounting of the assembly to the door. The video camera includes a right angle optical system which contributes to the compactness of the assembly. Both the console and the assembly include audio elements which permit simultaneous two-way communication. A limited number of conductors none of which carry high voltage couple the assembly and the console.

21 Claims, 9 Drawing Figures

VIDEO AND AUDIO SECURITY SYSTEM

BACKGROUND OF THE INVENTION

The present invention relates generally to a video and audio security system for monitoring an area, to such a system which controls a device disposed at the area, and to components of such systems. More specifically, the present invention relates to a video and audio security system and components thereof which monitors the area adjacent a structure such as a door and controls the structure so as to permit or prevent passage from the area.

Systems are known which audibly and visually monitor an area and control locking and unlocking of a door through which one may pass from the area. Such systems include a monitoring and control center, and video, audio and control apparatus disposed at the door. Such known systems suffer from one or more of the following drawbacks. A large number of conductors interconnect the monitoring and control center with the apparatus disposed at the door making installation complex and time consuming. One or more conductors interconnecting the monitoring and control center with the apparatus disposed at the door carry high voltage which present a danger of electrical shock. The monitoring and control center includes two or more components which are physically discrete pieces and are only interconnected by wiring, thereby presenting a cluttered appearance and making installation more time consuming. The apparatus disposed at the door includes physically discrete pieces which are only interconnected by wiring which also adds to the installation time and complexity. Audio communication between the monitor and control center and the door is by intercom which frequently cuts off or garbles portions of a two-way conversation. The video quality is poor, particularly in low light. The video components disposed at the door are rather large and as a result present mounting difficulties and/or are not mounted to the door.

The invention disclosed herein eliminates all of those drawbacks and provides additional advantages.

OBJECTS AND SUMMARY OF THE INVENTION

It is an object of the present invention to provide a video and audio security system in which there is essentially no danger of electrical shock from conductors extending between apparatus disposed at a monitoring location and apparatus disposed at a location remote from the monitoring location.

It is another object of the present invention to improve the appearance of a video and audio security system.

It is another object of the present invention to improve the appearance of apparatus of a video and audio security system disposed at a monitoring location of the system.

It is another object of the present invention to improve the appearance of apparatus of a video and audio security system located remotely from a monitoring location of the system.

It is another object of the present invention to facilitate installation of a video and audio security system, and components thereof, particularly a video and audio assembly to a structure such as a door.

It is another object of the present invention to reduce the number of conductors extending between apparatus disposed at a monitoring location of a video and audio security system and apparatus disposed remotely from the monitoring location.

It is another object of the present invention to improve the quality of audio communication between a monitoring location of a video and audio security system and a location remote from the monitoring location.

It is another object of the present invention to improve the quality of video displayed at a monitoring location of a video and audio security system.

It is another object of the present invention to reduce the size of a video and audio assembly so that it can be conveniently mounted to a structure such as a door or wall.

The invention disclosed in this application achieves the above and other objects and provides a video and audio console and a video and audio assembly adapted to be mounted remotely from the console.

The system can, in addition, include a remotely actuable device disposed in the area and actuable at the console for controlling a structure or piece of equipment, and can be used to control passage from the area. The system can also include a signalling device disposed at the console and an actuator disposed in the area for energizing the signalling device and thereby signalling someone at or near the console.

The console preferably includes a device for actuating the remotely actuable device disposed in the area and the signalling device as well as a video display, a speaker and a microphone. Thus, in accordance with this aspect of the invention, the console is a single, integrated piece of equipment. The console thereby presents a pleasing visual appearance, is easy to use and facilitates installation. The assembly includes a video camera, a speaker and a microphone. The components in the assembly are arranged compactly to present a pleasing visual appearance, facilitate installation and permit unobtrusive mounting of the assembly on, for example, a door or wall.

In accordance with one aspect of the invention, the two speakers and the two microphones, and associated audio circuitry provide for independent two-way audio communication between the remote assembly and the console.

In accordance with another aspect of the invention, any video drive circuitry and video processing circuitry for the video camera which are disposed in the assembly requires only a low voltage source of power to operate. Thus, only conductors carrying low voltage need to be run from a power supply disposed in the console and the assembly.

In accordance with another aspect of the invention, only four conductors excluding grounds and returns are run from the console to the assembly. One conductor carries the low voltage discussed above. Two conductors couple the respective microphones, speakers and audio circuitry for simultaneous, independent two-way audio. One conductor carries video from the camera or video processing circuitry disposed in the assembly to the console for display. Typically a power ground is run between the console and the assembly and a shielded cable is used for the video conductor from the assembly to the console. If desired, ground or a common conductor can be used as a common return for the audio conductors. The audio conductors can also be shielded, if desired.

Another conductor is used to couple the signalling device at the console and its actuator and a further conductor is used to couple the actuating device at the console and the remotely actuable device. A single, common conductor can be used to supply power to the actuator and to the remotely actuable device.

The components and circuitry linked by the aforementioned conductors are selected to operate from a low voltage so that none of the conductors carry a high voltage. Thus, there is no danger of electrical shock from the conductors running between the console and the assembly.

In accordance with another aspect of the invention, the drive circuitry for the video camera is disposed in the assembly and includes a DC to DC converter which generates the high voltage utilized by the video camera.

In accordance with another aspect of the invention, the video and audio assembly is structured so that it can be secured to a thin-walled structure such as a door. The assembly according to one embodiment includes a plate-like element adapted to be mounted to one side of the structure. A microphone and a speaker are mounted to the first plate-like element which includes a light transmitting aperture for the video camera. Another element carrying the video camera is mounted to the opposite side of the structure. A sleeve is disposed extending adjacent the aperture between the two elements in which is disposed the lens of the camera.

The second element preferably comprises a second plate-like element and a housing for the video camera. The second plate-like element is mounted to the opposite side of the structure and includes an aperture through which the camera lens extends from the housing into the sleeve. The housing is preferably supported by the second plate-like element. The second plate-like element preferably also includes a sleeve extending from the aperture in the second plate-like element. The dimensions of the two sleeves are slightly different so that the two sleeves can be telescoped. The assembly can thereby be mounted to structures of varying thickness.

The video camera in accordance with another aspect of the invention includes a right-angle optical system. The video camera and its optical system can thereby be made quite compact so that the assembly is compact and can be mounted to a structure such as a door.

In accordance with the illustrated embodiments, the assembly is mounted to a door and the system includes an electric door strike, i.e., the remotely actuable device is an electric door strike. The system can also include a doorbell button as the actuator device disposed at the door and a tone generator as the signalling device disposed at the console. An audio device can also be associated with the electric door strike to signal, for example buzz, when the door is being unlocked.

The above and other objects, aspects, features and advantages of the invention will be more readily perceived from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which.

DESCRIPTION OF THE PREFERRED EMBODIMENTS

Figure 1:
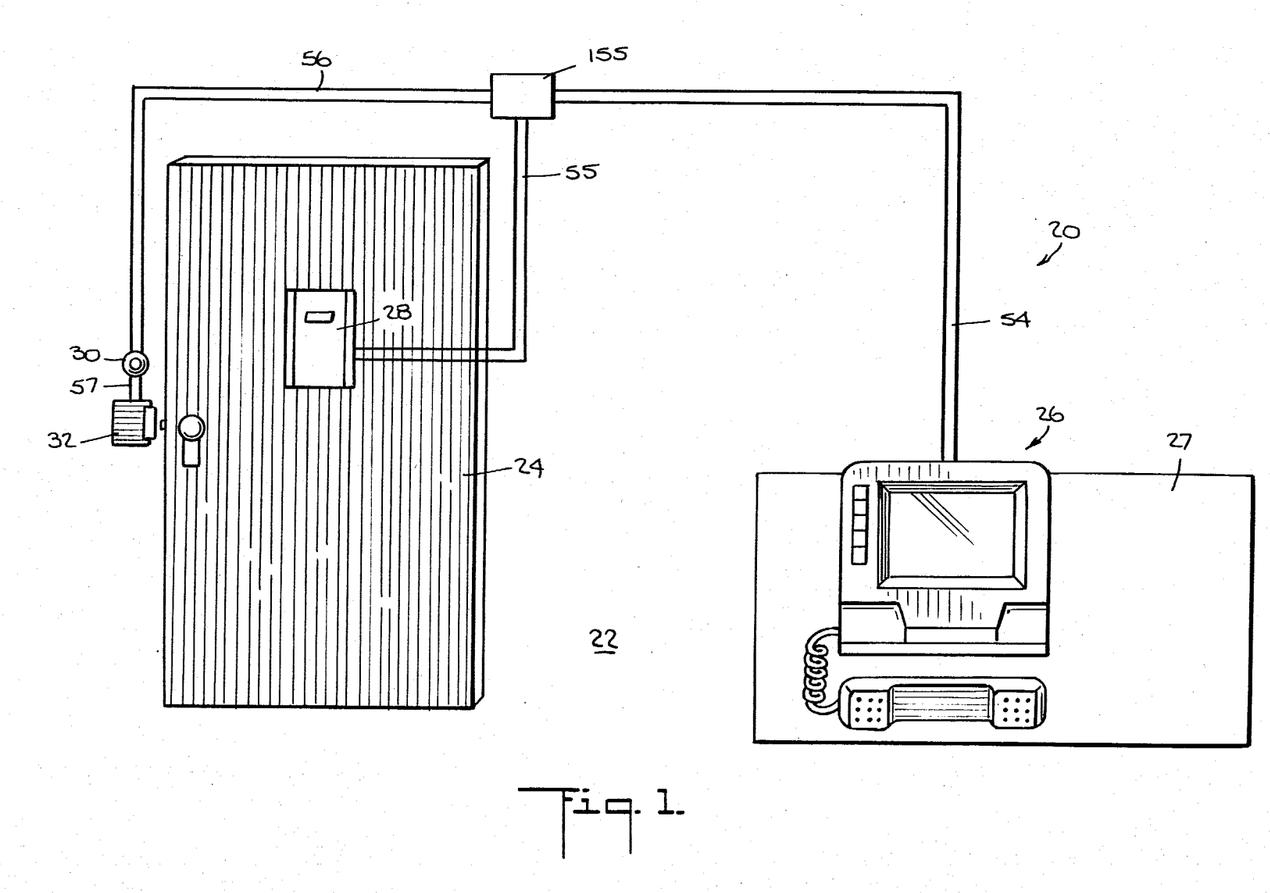
FIG. 1 is a perspective view of a video and audio security system according to the invention for monitoring and controlling entry into a room through a door.

Referring now to the drawings, embodiments of a video and audio security system and of components thereof according to the invention are illustrated for controlling passage from one area to another through a door separating the areas. FIG. 1 depicts a video and audio security system designated generally by 20 for monitoring and controlling entry into an area designated generally by 22 such as a room, suite of rooms, a building, etc., through a door 24. By way of example and for ease of description, the invention will be described for use in monitoring and controlling entry into a room 22, for example, an office, from the exterior of a building or from an interior area of a building, for example, a common hallway. However, it is contemplated that video and audio systems according to the invention can be disposed to monitor and control passage into and out of areas other than through a door. For example, a system can be disposed to monitor entry into the interior of an elevator and control operation of the elevator. Similarly, an inventive system can be disposed to monitor and control operation of almost any piece of equipment, for example, a computer.

Figures 2, 3:
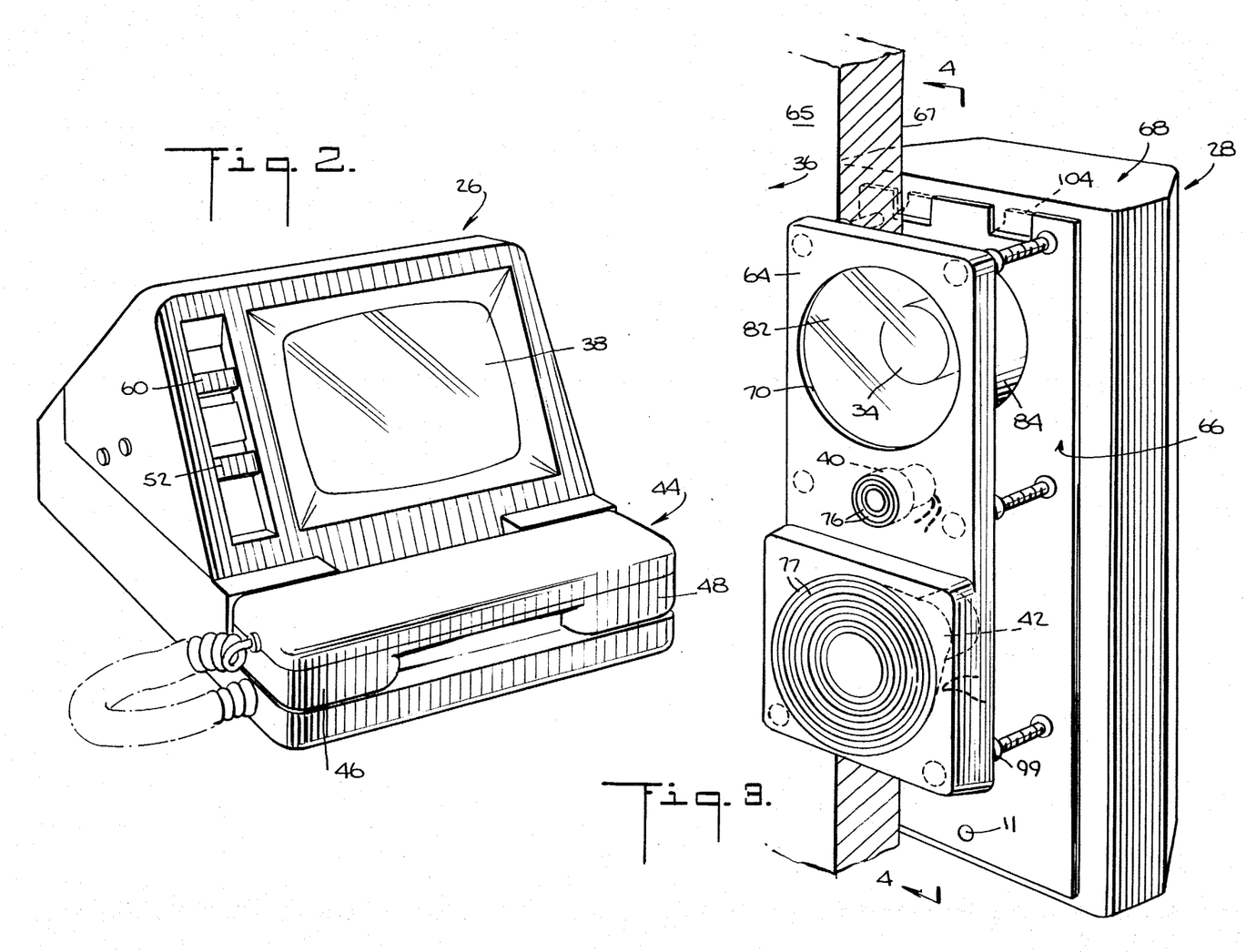
FIG. 2 is a perspective view of the video and audio monitor and control console of the system of FIG. 1.
FIG. 3 is a perspective view of the video and audio assembly of the system of FIG. 1 mounted to a door with the door in section and broken away.
Figures 4, 5:
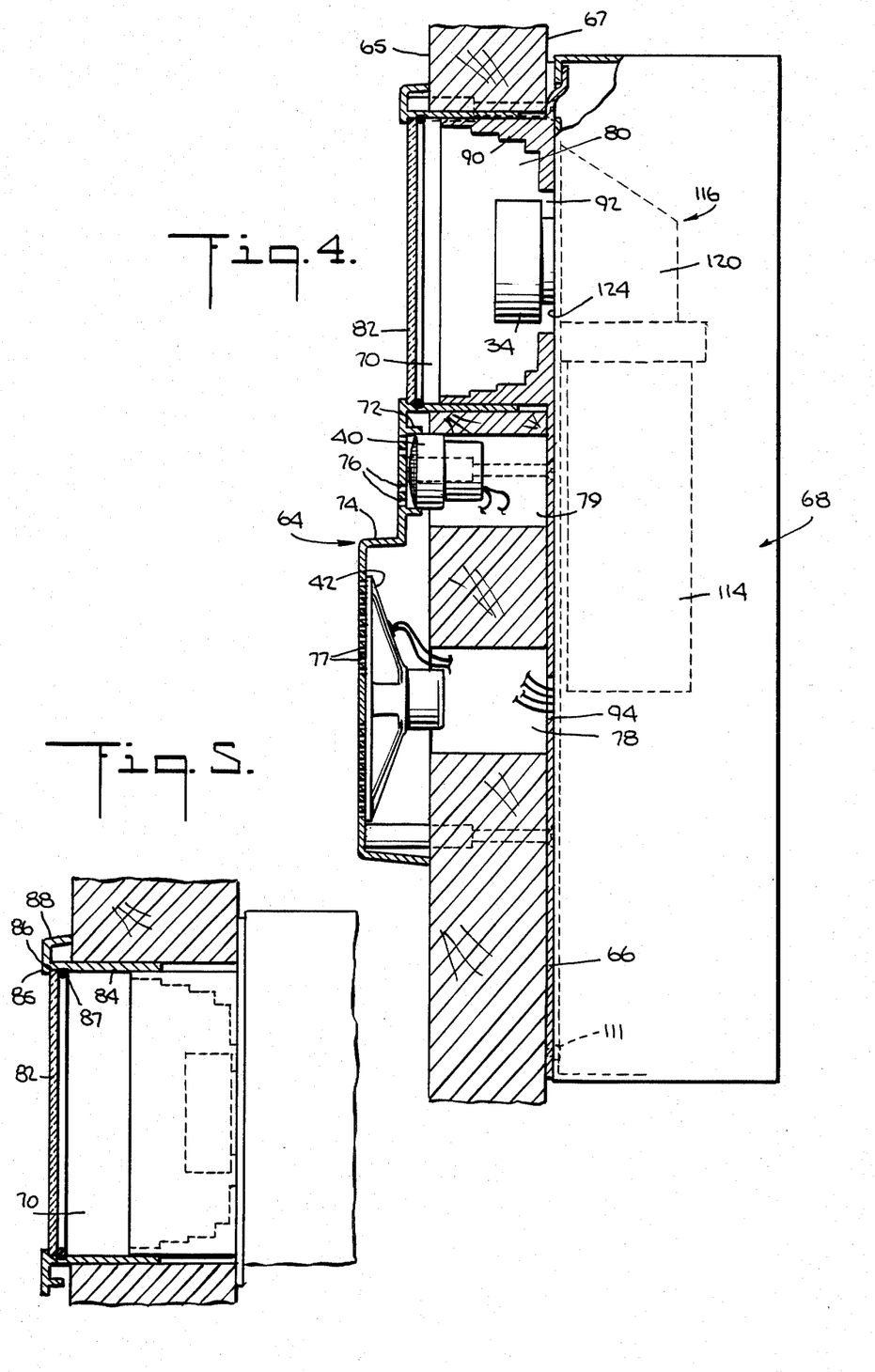
FIG. 4 is a section view of the assembly depicted in FIG. 3 taken through line 4—4 in FIG. 3.
FIG. 5 is an enlarged section view similar to that of FIG. 4 of the upper portion of the assembly.

The security system 20 depicted in FIG. 1 includes an audio and video monitor and control console 26 which can be disposed, for example, on a desk or table 27, or wall-mounted, a video and audio assembly 28 fastened to the door or a structure adjacent the door, a doorbell button 30 and an electrically controlled door strike 32. The assembly 28 includes a video camera having a lens 34 (FIG. 3) disposed with its field of view encompassing the area adjacent the outside 36 (indicated by an arrow) of the door. The console (FIG. 2) includes a video display screen 38 on which video received by the video camera is displayed. The assembly also includes a microphone 40 disposed to receive sound in the area adjacent the outside of the door and a speaker 42 disposed to transmit sound into the area adjacent the outside of the door, and the console includes a hand set 44 which includes a microphone 46 and a speaker 48 coupled through respective audio amplifiers to the speaker 42 and microphone 40 of the assembly to permit simultaneous two-way audio between a person at the outside of the door and a person at the console.

The doorbell 30 is coupled to an audio and/or visual indicator taking the form of a bell tone (not shown in FIG. 2) at the console so that a person wishing to gain entry to the room 22 can signal a person inside the room. Opening of the door is controlled by the electric door strike 32 which is coupled to and controlled by an actuator in the form of a momentary contact switch 52 at the console.

The console 26 is coupled to the assembly 28, the doorbell 30 and the door strike 32 by electrical conductors designated generally in FIG. 1 by 54–57. However, it is within the scope of the invention that the console, the remote assembly, the doorbell and the door strike be linked in other ways, for example, by wireless transmission systems utilizing, for example, radio waves, ultrasonic sound or infrared light, or by light conducting systems such as fiber optic systems.

A switch 60 is provided on the console for activating the system. The switch 60 connects AC power to the console power supply which in turn activates the video and audio portions of the system and enables the doorbell and door release for operation under control of the console. The system can also be activated by the doorbell, if desired, in addition to or instead of by the power switch 60. Once the system is activated, the door area can be visually and audibly monitored, and the door strike controlled, all remotely from the door at the console. Thus, a person at the door can be visually observed and conversed with before the door strike is released to permit the door to be opened.

Referring now to FIGS. 3-6, the assembly 28 includes an exterior plate 64 mounted to the exterior side 65 of the door, an interior plate 66 mounted to the interior side 67 of the door and a camera and circuit box 68 secured to the interior side of the door. The exterior plate 64 is made of a strong, break-resistant material such as steel of a thickness to provide substantial rigidity to the plate. In the plate 64 are provided an opening 70 for the lens 34, a receptacle 72 (FIG. 4) on the interior side of the plate for the microphone 40 and another receptacle 74 for the speaker 42. Openings 76, 77, preferably annular, are provided in the plate 64 adjacent the receptacles 72, 74, respectively to permit sound to pass therethrough. The enclosure 74 for the speaker preferably projects from the exterior side of the plate to accommodate at least the cone portion of the speaker. An enclosure is thereby formed for the speaker so that a large diameter hole does not have to be made in the door to accommodate the speaker. The microphone receptacle may similarly project, if desired.

Respective openings 78–80 are made through the door to permit the lens 34 to be mounted adjacent the lens opening 70 in the plate, conductors to be passed through the door to the microphone and speaker, and to accommodate a portion of the microphone 40 and the speaker magnet, respectively. A break-resistant lens cover 82 is disposed in the plate opening 70 for the lens. A sleeve 84 (FIG. 5) is secured to the interior of the plate 64 and extends outwardly therefrom coaxially with the opening 70. The diameter of the sleeve 84 is slightly larger than the diameter of the opening 70 so that the opening forms a lip 85 about the circumference of the sleeve. In addition, an annular groove 86 is formed along the inner circumference of the sleeve adjacent the lip. The diameter of the lens cover 82 is slightly less than the diameter of the sleeve and is slightly greater than the diameter of the opening 70. The lens cover is secured in the sleeve butted against the lip 85 by a circular springed keeper 87 which is retained in the annular groove 86.

A rib 88 is disposed about the perimeter of the plate 64 to provide a finished mounting surface for the plate as well as for rigidifying the plate.

The interior plate 66 can, on the other hand, be substantially flat, except for a stepped sleeve 90 secured to the interior side of the plate and extending coaxially with an opening 92 in the plate for the lens 34. Sleeves 84 and 90 are sized so that the stepped sleeve 90 telescopes into the other sleeve 84. The telescoping of the two sleeves when the two plates are mounted to the door provides a light-tight passage from the lens opening 70 in the exterior plate 64 to the lens 34 while enabling adjustment of the two plates for use with doors of different thickness. The diameter of opening 92 is less than the diameter of the sleeve 90 and is sized to permit passage of the lens 34.

An opening 94 is provided in the interior plate 66 to permit passage of conductors from the microphone and speaker on the exterior plate to the camera and circuit box 68. Preferably the conductors from the microphone and speaker are connected to a connector 96 (FIG. 6) which is passed through the opening 78 in the door for the speaker magnet, and the conductors from the camera and circuit box 68 are connected to a mating connector 97. The connectors are joined together from the interior side of the door and the mated connectors can be positioned in the door opening 78. The opening 94 in the plate is sized to permit passage of the connectors. Exterior plate 64 with the speaker and microphone mounted thereto is provided as an assembly ready for mounting to the door. Interior plate 66 is also provided as a separate piece from the camera and circuit box ready for mounting to a door.

Figure 6:
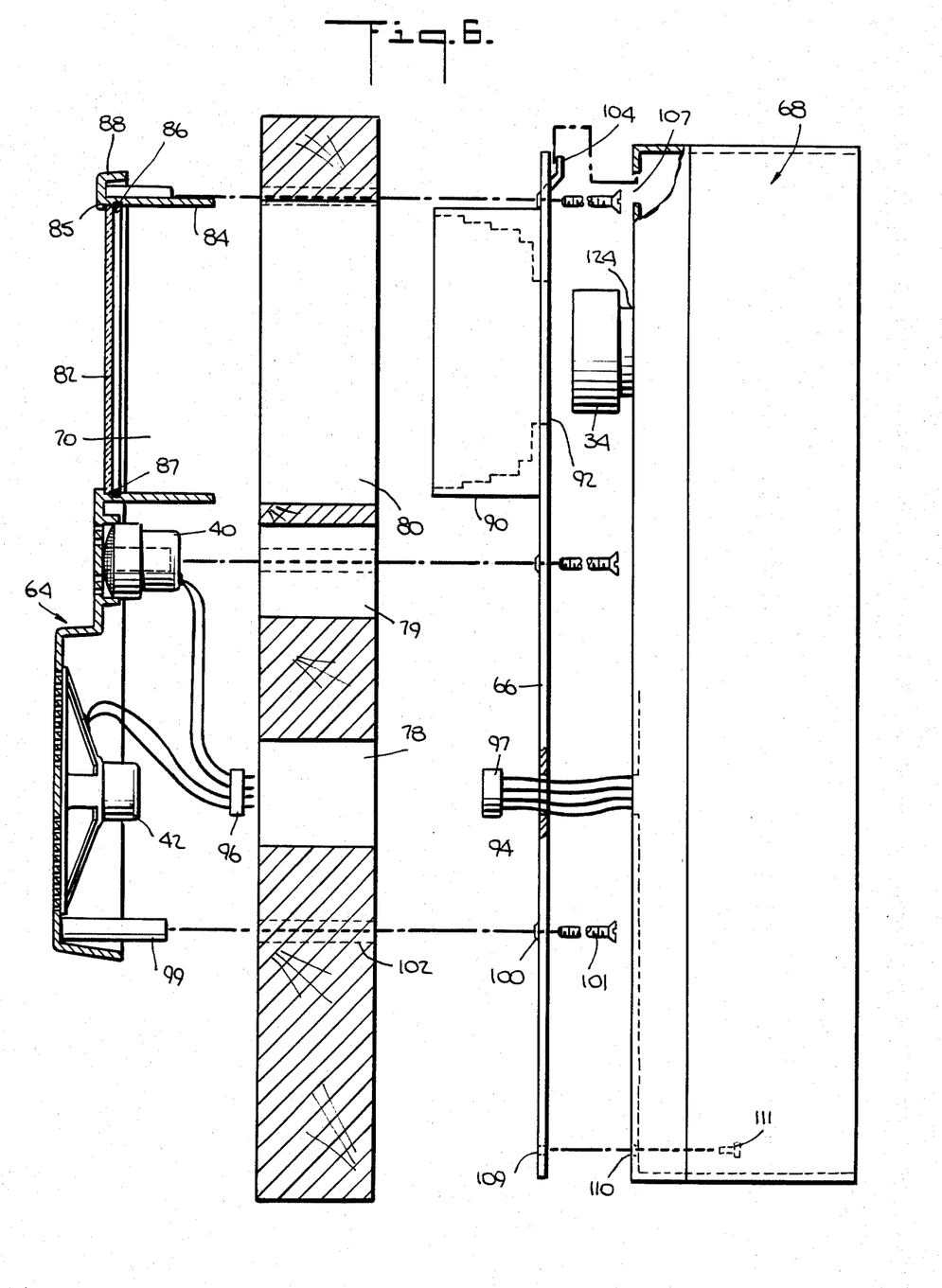
FIG. 6 is an exploded-sectional view similar to that of FIG. 4 of the assembly.

The interior and exterior plates are secured to the door by fastening and drawing the two plates together to sandwich the door between the plates. The exterior plate 64 includes six interiorly threaded posts 99 and the interior plate includes six correspondingly located through holes 100 (FIG. 6). Screws 101 passed through the holes 100 in the plate and holes 102 in the door are threaded into the posts to draw the two plates together.

Figure 7:
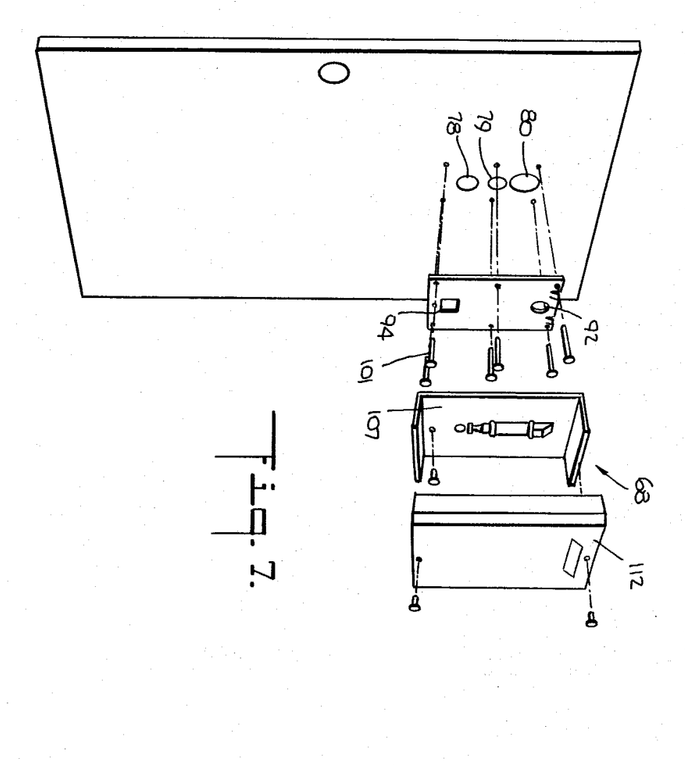
FIG. 7 is an exploded schematic view of the assembly.

The interior plate 66 includes two lanced portions 104 extending from the exterior side of the plate which form hangers for suspending the camera and circuit box 68. Slots 105 in the chassis 107 of the camera and circuit box receive the lanced hangers. The plate 66 also includes a threaded hole 109, and the chassis a through hole 110 for fastening the chassis to the plate with a screw 111. After the two plates have been drawn together, the chassis 107 is secured to the interior plate with the camera and circuit box cover 112 removed (FIG. 7). Thereafter, the cover 112 is secured to the chassis using, for example, screws and/or a snap arrangement.

Figure 8:
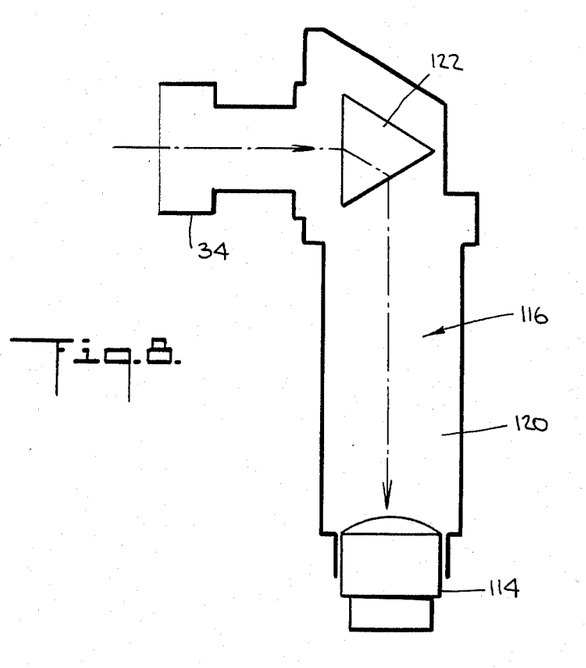
FIG. 8 is a schematic view of a right-angle optical system for directing light to a camera in the assembly.
Figure 9:
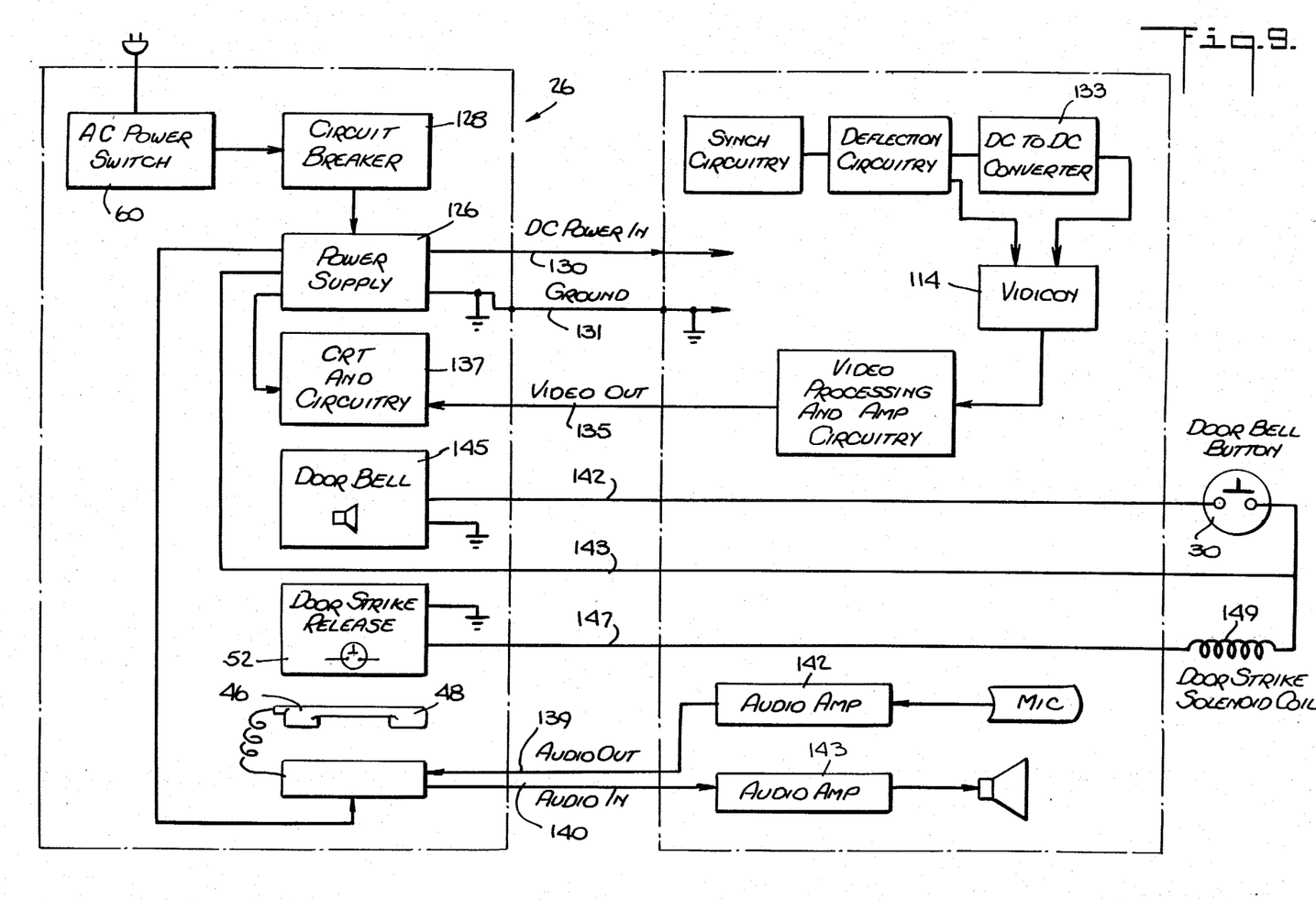
FIG. 9 is an electrical block diagram of the system of FIG. 1.

Mounted in the camera and circuit box is a conventional vidicon television camera 114 (FIGS. 4, 7 and 8), a right angle optical system 116 (FIG. 8), and video circuitry and audio circuitry (FIG. 9). The camera and circuitry are conventional and will therefore not be described in detail. The camera and optical system are mounted in the chassis 107, for example, to a printed circuit board (not shown) secured in the chassis. As depicted schematically in FIG. 8, the camera 114 is secured light-tight to one side of a light-tight housing 120 for the optical system in which is disposed a right angle refracting prism 122. The lens 34 is secured light-tight to the other side of the housing. The right angle system is per se conventional and right angle optical systems other than the one illustrated may be utilized. Use of a right angle optical system in accordance with the invention enables the camera to be mounted parallel to the door. Accordingly, the camera and circuit box can be made relatively small in size and can be no larger than known door chime boxes.

A hole 124 (FIG. 4) is provided in the chassis through which the end of the optical housing 120 and the lens 34 extend so that the lens is disposed in the telescoped sleeves when the camera and circuit box are mounted to the door.

In accordance with the invention, the camera lens 34 is wide angle and the video circuitry and camera were selected so as to provide good contrast in low light. Such lenses, circuitry and cameras are known in the optical art. In addition, the sleeve 90 is stepped and blackened to deflect light and enhance the low light performance of the camera.

Referring to FIG. 9, the console 26 includes a power supply 126 which receives the AC line through a circuit breaker or fusing 128 and the power switch 60 and supplies all of the AC and DC voltages required in the console, and low voltage, e.g. 12 v, DC for the camera and circuit box. The power supply itself is conventional. Seven conductors excluding grounds and returns run between the console and the door. With a ground, also functioning as a return, the total is eight. Two conductors, 130, 131 (ground) supply the low voltage DC to the camera and circuit box. A DC regulator (not shown) can be provided in the camera and circuit box and the low voltage DC can be used as required. The low voltage DC is also fed to a DC to DC converter 133 which provides the higher voltages needed by a vidicon camera 114.

A third conductor 135 provides low voltage video signals from the video camera to a CRT display 137 and its associated circuitry in the console. This conductor is preferably shielded (not shown). Fourth and fifth conductors 139, 140 carry low voltage audio between the console microphone 46 and speaker 48 and audio amplifiers 142, 143 in the camera and circuit box. Two amplifiers and two sets of microphones and speakers are provided to enable independent two-way audio. Ground is used as the return for the audio system. A sixth conductor 142 couples the door bell button 30 mounted at the door and an audio device (door bell) 145 such as a tone generator in the console. A seventh conductor 143 is coupled to the door bell button 30 from the power supply 126 to provide a source of power to the audio device 145 through the door bell button 30 and conductor 142. The audio device 145 is grounded thereby completing the circuit from the power supply when the door bell button is depressed. An eighth conductor 147 couples the coil 149 of a solenoid in the door strike and a door strike release (momentary push button switch) 52 in the console. The door strike release is grounded and power is coupled to the solenoid by conductor 143. Upon depressing the switch 52, the power circuit through the solenoid is closed so that the energization state of the solenoid is changed to release the strike.

In accordance with the invention, only eight conductors need be run from the console to the door, all of which carry low voltage. Further, in accordance with the invention, components located at the door are selected which are of low power consumption. Thus, the current transmitted between the console and the door can also be low. As a result, there is essentially no electrical shock hazard present at the door or by the conductors running from the console to the door.

The door strike, tone generator, push buttons, CRT and its circuitry, the video camera, the video and audio circuitry in the camera and circuit box, the power supply, and the handset are themselves conventional and therefore will not be described further. Preferably the video camera is of the electrostatic deflection yoke type. This type draws less current but requires higher voltage. The DC to DC converter 133 supplies the necessary voltage. For example, the door strike can be controlled by a 12 v DC solenoid coil which draws about 150 ma, lens 34 can be a 6 mm, F4 lens, the vidicon camera can be a GBC model VDV 300, which with its circuitry draws about 260 ma, available from GBC Closed Circuit TV Corp., New York, N.Y. Other components of the system are conventional and can be purchased off the shelf or fabricated by one of skill in the art.

Although the conductors for the doorbell button and the door strike are shown in FIG. 8 to be routed through the camera and circuitry box, they can be connected directly from the console or through a junction box 155 as shown in FIG. 1.

Although it is preferred that video circuitry and audio circuitry be provided at the door, such circuitry could be located at the console and shielded cable can be used wherever low level signals are carried. Alternatively or in addition, pre-amplifiers could be used at the camera and circuit box to amplify low level signals prior to transmitting them to the console.

If it is desired that the doorbell actuate the system, a turn-on circuit can be provided which detects pressing of the button and in response thereto switches power to the system.

Where a D.C. solenoid is used in the door strike, an audio device such as a buzzer can be used to indicate when the state of energization of the solenoid is being changed.

Certain changes and modifications of embodiments of the invention disclosed herein will be apparent to those skilled in the art. It is the applicants' intention to cover by their claims all those changes and modifications which could be made to the embodiments of the invention herein chosen for the purposes of disclosure without departing from the spirit and scope of the invention.

What is claimed is:

1. A video and audio security system for monitoring an area, passage beyond which is controlled by a remotely actuable device, the system comprising:
 (1) a video and audio assembly including a video camera, a first speaker and a first microphone, said assembly being disposed to monitor said area and including means for mounting said assembly to a structure such as a door, a wall and the like near said area, said structure having an exterior side and an interior side, said means for mounting including (i) a first plate-like element having an interior and an exterior side, the interior side of said first plate-like element facing said structure when mounted thereto, said first microphone and said first speaker being mounted on the interior side of said first plate-like element, said first plate-like element further including means therein adjacent said first microphone and first speaker to permit sound to pass through said element, and a first light-transmitting aperture, and (ii) a second element adapted to be mounted to a side of said structure opposite the side to which said first plate-like element is mounted, said second element having an interior side facing said structure when mounted thereto and including a second light-transmitting aperture, (iii) a sleeve means extending through said structure between said first and second apertures when said assembly is mounted for use, said video camera being mounted to said second element and having a lens extending through said aperture into said sleeve; and (iv) fixing means for attaching said first plate-like element and said second element to said structure, said system further comprising (2) a video and audio console spaced from said video and audio assembly, said console including a video display coupled with said video camera to display images received therefrom, a second speaker coupled with said first microphone, a second microphone coupled with said first speaker, and an actuating means operatively coupled with said remotely actuable device;

(3) electric circuitry means including electric circuits coupled with said first and second microphones and said first and second speakers to provide independent two-way sound transmission between said area and said console; and (4) means for coupling said console to a source of power for supplying power to said console and said assembly.

2. The security system according to claim 1 and including an actuator adapted to be mounted on or adjacent a door which controls passage from said area, the remotely actuable device controlling locking and unlocking of the door, the console including a signalling device, the actuator being operable with a low voltage which is supplied by the means for supplying power to control energization of the signalling device, and means coupling the actuator and the signalling device.

3. The security system according to claim 1 wherein the console includes a handset in which are mounted the second speaker and the second microphone.

4. The security system according to claim 1 and including the remotely actuable device which comprises a door strike and means which are electrically actuated for controlling operation of the door strike, the door strike being adapted to be mounted on or adjacent the door for locking and unlocking it, the door controlling passage from said area.

5. The security system according to claim 4 wherein the means for controlling is operable with a low voltage which is supplied by the means for supplying power, and including means coupling the low voltage from the means for supplying in the console to the means for controlling.

6. The security system according to claim 1 wherein the means for supplying power includes a low-voltage output, the system including means coupling the low-voltage output to the assembly for supplying all of the power utilized by the assembly.

7. The security system according to claim 6 and including drive circuitry for the video camera disposed at the assembly including means for converting the low voltage from the console to one or more higher voltages supplied to at least one of the drive circuitry and the video camera.

8. The security system according to claim 6 and including video amplifying and processing circuitry disposed at the assembly coupled to an output of the video camera and to the video display.

9. The security system according to claim 6 wherein the electric circuitry coupled to the microphones and speakers is disposed at the assembly and is coupled to receive in the assembly the low voltage output from the means for supplying.

10. A video and audio assembly for a video and audio monitoring system adapted to be mounted to a structure such as a door, comprising:

a first plate-like element adapted to be mounted to one side of the structure and having an exterior side and an interior side, the interior side facing the structure when the first plate-like element is mounted thereto, a first speaker mounted to the interior side of the first plate-like element which adjacent the first speaker is structured to permit sound to be transmitted from the first speaker through the first plate-like element to the exterior side thereof, a first microphone mounted to the interior side of the first plate-like element which adjacent the first microphone is structured to permit sound to pass from the exterior side of the first plate-like element therethrough to the first microphone, the first plate-like element having a first light-transmitting aperture;

a second element adapted to be mounted to another, opposite side of the structure and having an interior side facing the structure when the second element is mounted thereto, the second element having a second light-transmitting aperture;

a sleeve adapted to extend through the mounting structure between the first and second apertures when the video camera is mounted to the second element and when the second element is mounted to the structure, and having a lens extending through the second aperture into the sleeve; and means for attaching the first plate-like element and the second element to the structure.

11. The assembly according to claim 10 wherein the second element comprises a second plate-like element having an interior side and an exterior side, a housing for the camera, and means for attaching the housing to the second plate-like element with the housing facing the exterior side of the second plate-like element, the means for attaching the second element to the structure attaching the second plate-like element to the structure.

12. The assembly according to claim 11 wherein the sleeve is attached to the first plate-like element, and comprising another sleeve attached to the second plate-like element adjacent the second aperture extending from the interior side of the second plate-like element, the two sleeves being of slightly different dimensions so as to permit telescoping of the sleeves when the assembly is mounted.

13. The assembly according to claim 11 wherein the means for attaching the first and second plate-like elements to the structure comprise fasteners engaging the two plate-like elements and extending through the structure when the assembly is mounted, the fasteners drawing the two plate-like elements together, sandwiching the structure therebetween.

14. The assembly according to claim 11 and including audio amplifying circuitry disposed in the housing coupled to the first microphone and the first speaker, the amplifying circuitry permitting simultaneous, independent use of both the microphone and the speaker.

15. The assembly according to claim 11 wherein the video camera includes a right angle optical system terminating in said lens, the right angle optical system being supported by the housing.

16. The assembly according to claim 11 and comprising circuitry disposed in the housing for operating the video camera, the circuitry including voltage conversion means for converting a low voltage to a high voltage.

17. The assembly according to claim 16 and comprising video processing and amplifying circuitry disposed in the housing coupled to the output of the video camera.

18. A video assembly, for a video monitoring system, adapted to be mounted to a thin-walled structure such as a door, comprising:
- a video camera including an optical system having a lens;
- a first plate-like element adapted to be mounted to a side of said structure and having an exterior side and an interior side which faces said structure when said first plate-like element is mounted thereto, said first plate-like element having a first light-transmitting aperture;
- a subassembly to which said video camera is mounted, said subassembly including means for mounting it to one side of said structure with said lens extending into an opening in said structure to receive images present on an opposite side of said structure, said subassembly having an interior side which faces said structure when said subassembly is mounted thereto, and a second light-transmitting aperture; and
- sleeve means extending through said mounting means between said first and second aperture when said video camera is mounted to said subassembly and said subassembly is mounted to said structure, wherein said lens extends through said second aperture into said sleeve.

19. The assembly according to claim 18 wherein the video camera includes a right angle optical system terminating in said lens, the right angle optical system being mounted to said subassembly.

20. The assembly according to claim 18 wherein the subassembly comprises a second plate-like element having an interior side and an exterior side, a housing for the camera, and means for attaching the housing to the second plate-like element with the housing facing the exterior side of the second plate-like element.

21. The assembly according to claim 20 wherein the sleeve is attached to the first plate-like element, and comprising another sleeve attached to the second plate-like element adjacent the second aperture extending from the interior side of the second plate-like element, the two sleeves being of slightly different dimensions so as to permit telescoping of the sleeves when the assembly is mounted.

* * * * *